Oct. 14, 1958     D. E. LOCKWOOD     2,856,139
AIRCRAFT LAUNCHER

Filed April 5, 1956     3 Sheets-Sheet 1

INVENTOR.
DOYLE E. LOCKWOOD
BY
*Salvatore G. Militana*
ATTORNEY

Oct. 14, 1958

D. E. LOCKWOOD 2,856,139

AIRCRAFT LAUNCHER

Filed April 5, 1956

INVENTOR.
DOYLE E. LOCKWOOD
BY Salvatore G. Militano
ATTORNEY

Oct. 14, 1958  D. E. LOCKWOOD  2,856,139
AIRCRAFT LAUNCHER
Filed April 5, 1956  3 Sheets-Sheet 3

INVENTOR.
DOYLE E. LOCKWOOD
BY
*Salvatore G. Militano*
ATTORNEY

United States Patent Office 2,856,139
Patented Oct. 14, 1958

2,856,139

AIRCRAFT LAUNCHER

Doyle E. Lockwood, North Miami, Fla., assignor to Albert W. Hainlin, Coral Gables, Fla.

Application April 5, 1956, Serial No. 576,346

10 Claims. (Cl. 244—63)

This invention relates to launching devices and is more particularly directed to aircraft launchers particularly for target purposes.

At present there are two methods of putting target aircraft into the air: First, the most common method is by carrying the target aloft on the wing of a larger plane and releasing the target while in flight. This method has the following disadvantages.

(1) High cost of operation.
(2) Danger of collision due to failure of properly launching the target plane.
(3) Operations are limited to the vicinity of the air base capable of providing facilities of the launch.
(4) Weather conditions may prevent use of the launch plane when a target is desired.
(5) Launch plane maintenance and lack of a crew delay or force cancellation of target missions.

The second method of launching a target aircraft is by the use of jato. This method has the following disadvantages:

(1) A jato launching using a zero length launcher requires very delicate and precise aligning and balancing adjustments.
(2) Danger of destruction of the target plane due to the fact that each launching is a highly critical operation.
(3) At each launching, the jato and the apparatus for connecting the jato to the target are expended at considerable cost.

Therefore, a principal object of the present invention is to provide a mobile launcher which avoids the above listed disadvantages and which is relatively inexpensive in cost of operation, is simple in its operation, and which is most effective in providing the forces and velocities necessary for launching aircraft, especially for target purposes.

A further object of the present invention is to provide a launcher with a combination of a deformable or flexible tubular member and a roller for imparting high velocity to a plane-carrying carriage for launching the plane.

A further object of the present invention is the provision of a launcher described as above wherein the same gases under pressure which are utilized to inflate the flexible tubular member and impart a force on the roller serve to arrest the moving roller after the plane has been launched.

With these and other objects in view, the invention will be best understood from a consideration of the following detailed description taken in connection with the accompanying drawings forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 2:
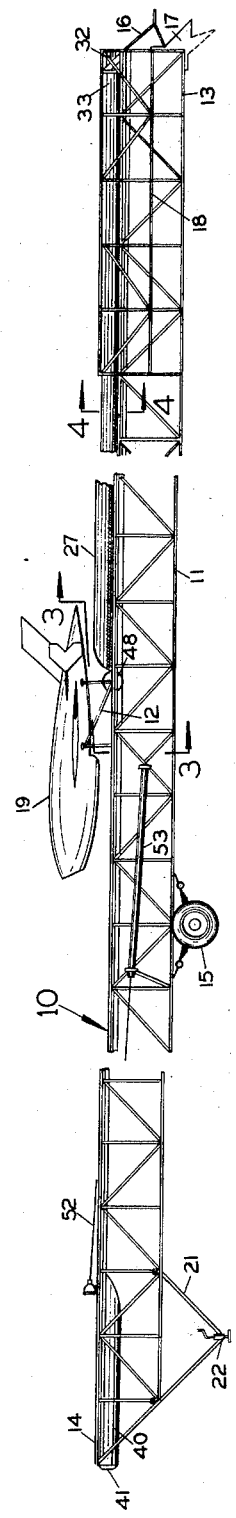
Figure 2 is a top plan view thereof.
Figure 1:
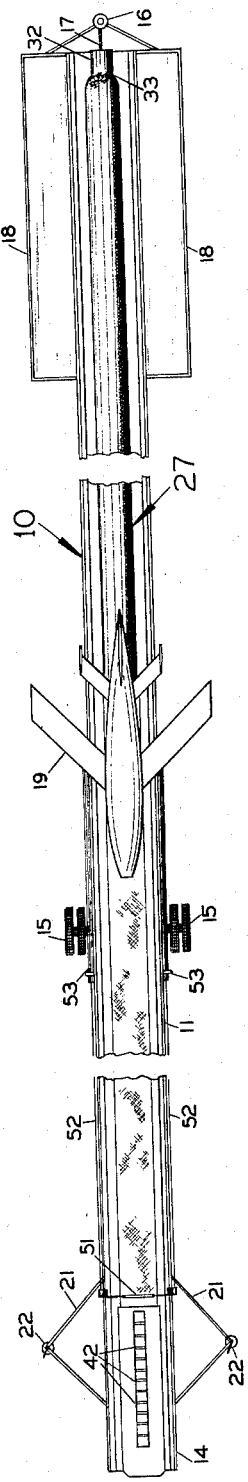
Figure 1 is a side elevational view of a target aircraft launcher embodying my invention.

Referring now more particularly to the drawings wherein like numerals are used to designate similar parts throughout the several views, the numeral 10 refers to a catapult or launching device consisting of an elongated framework 11 and a carriage 12 mounted thereon for movement from the rear or starting end 13 to the forward or launching end 14 of the framework 11. A set of wheels 15 support the framework 11 at a position forward of the mid-length thereof rendering the device 10 heavy at the rear end 13 where a tow bar 16 is secured for towing the device 10 to and from a launching site. A spade 17 provided at the rear end 13 of the framework 11 is adapted to be embedded in the earth for anchoring the device 10 preparatory to launching a target plane from the device 10. Further, along each side of the framework 11 at the rear end 13 thereof, an elevated platform 18 is mounted to permit easy accessibility to the carriage 12 and target plane 19 to persons working thereon. The platform 19 may be secured to the framework 11 by hinges or the like in order that the platforms 18 may be folded over the framework 11 when the device 10 is being transported or otherwise not in use. At the forward end 14 of the framework 11 at each side thereof is an outrigger 21 pivotally secured thereto and on whose outer ends an adjustable levelling device 22 is threadedly mounted for supporting the launching end 14 of the device 10. The levelers 22 may be adjusted to maintain both sides of the framework 11 level with respect to each other, though the framework 11 is normally higher at the launching end 14 than at the rear end 13 as is explained in greater detail hereinafter.

Figure 3:
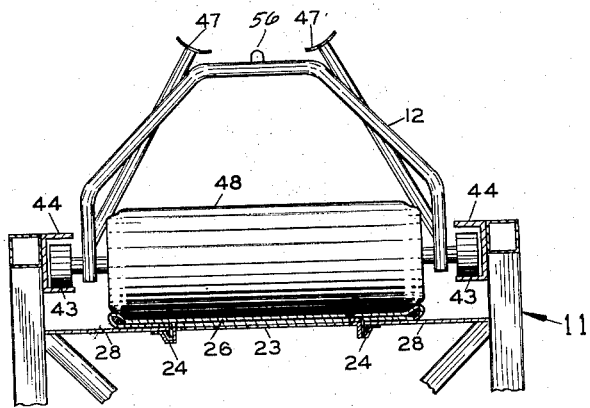
Figure 3 is a cross sectional view taken along the line 3—3 of Figure 1.
Figure 5:
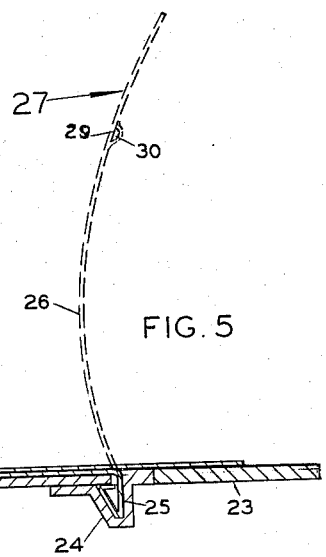
Figure 5 is an enlarged fragmentary and detailed view showing the manner of securing edges of a flexible propulsion tubular member.
Figure 4:
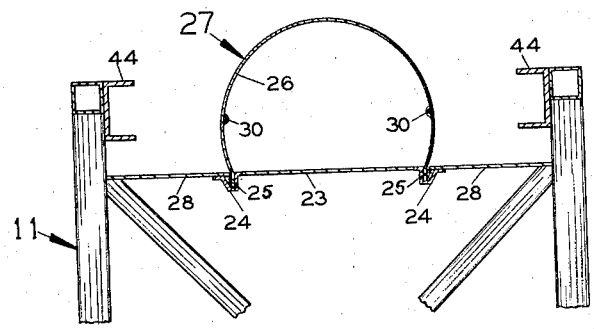
Figure 4 is a similar view taken along the line 4—4 of Figure 1.
Figure 7:
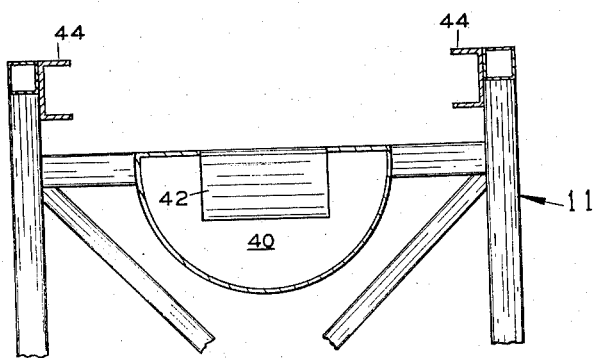
Figure 7 is a cross sectional view taken along the line 7—7 of Figure 6.
Figure 6:
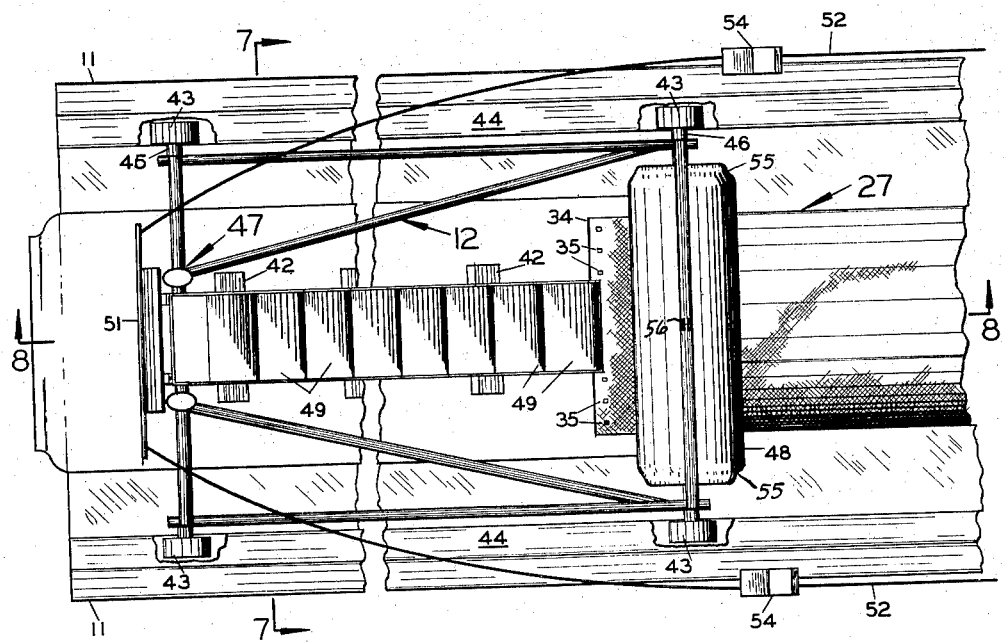
Figure 6 is an enlarged top plan view of the forward end of the launcher with the carriage shown in position thereon.
Figure 8:
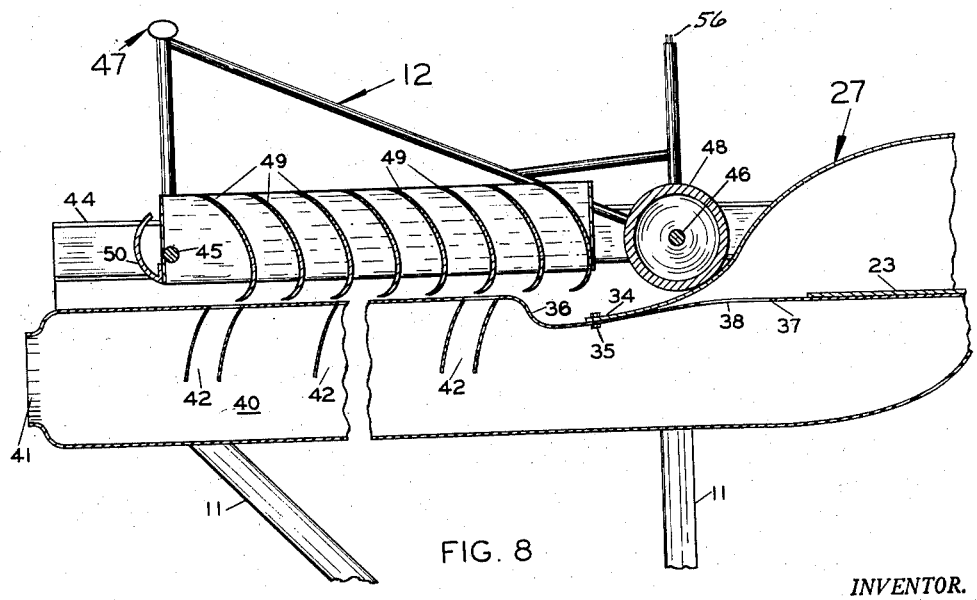
Figure 8 is a longitudinal sectional view taken along the line 8—8 of Figure 6.

Along substantially the full length of the device 10 and supported on the framework 11 spaced from the sides thereof is a bed plate 23 with a cleat 24 secured as by welding along each side of the bed plate 23. The cleats 24 are extruded members provided with a recess 25 for receiving the side edges of an elongated plastic coated fabric sheeting 26 which forms a flexible tube 27 with the bed plate 23 as one side thereof. The edges of the sheeting 26 are locked in the cleats 24 by a further plate member 28 engaging the cleats 24 and the fabric 26 as shown best by Figures 3–5 inclusive and extending outwardly to the sides of the framework 11 to which the plate members 28 are secured and supported thereby. It is to be noted that the launching device may be provided with a tubular shaped propulsion member 27 in lieu of the fabric sheeting 26 and cleats 24, but it is believed that construction shown and described is less expensive in construction and maintenance and the results achieved will be as effective as those produced by a completely tubular propulsion tube. Prior to the launching of a target plane by the launcher 10, the fabric sheeting 26 is normally in a folded position lying flat on the plate members 23 and 28. At the position of the folds as at 29 along each side of the fabric sheeting 26 which forms the flexible propulsion tube 27, there is secured to the inner wall of the sheeting 26 a rubber or plastic member 30 having an arcuate cross section whereby the otherwise void space formed by the fold at 29 is occupied by the member 30. This prevents the escape of any gases as is explained in detail hereinafter and also prevents the folds 29 from becoming split or cracked as will become evident upon further description of the device 10. The ends of the propulsion tube 27 are opened, one end 33 being secured to a breech block 32 so as to communicate with the discharged gases of a cartridge fired at the breech block 32. Since the construction of the breech block 32 is conventional and well known to those versed in the art, it forms no part of the present invention except as being a source of expanding gases under high pressure. If desired, a tank containing gas under high pressure may be substituted for the breech block and cartridge construction. The other end 34 of the propulsion tube 27 is secured to the bed plate 23 as at 35 in a depression 36 formed by the bed plate 23 inclining downwardly as at 37 from its horizontal position a short distance from the end thereof. The bed plate 37 is provided with an opening 38 to permit the escape of gases from the propulsion tube 27 into a plenum chamber 40 mounted on the framework 11 at the forward end 14. The forward extremity 41 of the plenum chamber 40 is open, operating as an exhaust tube 41 to permit some of the gases therein to escape to the atmosphere while some of the gases will be directed upwardly and rearwardly through discharge nozzles 42 mounted in the upper portion of the plenum chamber 40 along the longitudinal axis of the framework 11. The discharge nozzles 42, arcuate in cross section and positioned so as to discharge gases from the plenum chamber 40 in a rearward direction, form a part of the braking system for arresting the carriage 12 in its forward movement along the launcher 10.

Means are provided for permitting of the carriage 12 to travel along the framework 11 comprising two sets of rollers or wheels 43 rotatably mounted within U-shaped members 44 extending along each side of the framework 11. The two sets of wheels 43 are mounted on the ends of transverse shafts or axles 45 and 46, on which a cradle 47 is secured for supporting the target plane 19. The target plane is secured to the cradle 47 in the conventional manner by the use of shear pins (not shown) at the three positions of contact of the plane 19 and the cradle as 47, 47 and 56.

Mounted on the rear shaft 46 is a substantially cylindrical roller 48 positioned on the folded fabric sheeting 26. As stated, the profile of the roller 48 is substantially cylindrical; however, at the end portions of the roller 48 there is a recess 55 having an arcuate configuration in conformity with the slight bulge formed by the tubing 30 at the folds 29 of the fabric sheeting 26. As can be readily seen, the roller compels the upper and lower folds of the sheeting 26 to be in contact with each other and the bed plate 23 along the full width of the propulsion tube 27 so that at no position along the full length thereof can there be an escape of gas under pressure beyond the position of the propulsion roller 48 until the latter has rolled past the opening 38 in the bed plate 23. If desired, a series of such rollers 48 may be utilized to ensure that none of the expanding gases in the propulsion tube escapes past the rollers 48.

On the carriage 12 between the roller 48 and the shaft 45 are a plurality of deflector plates 49 mounted in a row. The deflector plates 49 are arcuate in cross section and adapted to receive the gases discharged rearwardly through the discharge nozzles 42 so as to effect a braking force on the forwardly moving carriage 12.

Mounted at the forward portion of the carriage 12 is a bumper guard 50 which is adapted to engage an arresting strap 51 which extends across the width of the framework 11 rearwardly of the exhaust braking nozzles 42. The ends of the strap 51 are secured to cables which are connected to pistons (not shown) mounted in hydraulic cylinders 53 secured to the sides of the framework 11 of the launcher 10. By the use of the hydraulic arresting device herein described and the gases discharged through the nozzles 42, the carriage 12 is brought to a complete stop on the launcher 10 at the forward end thereof.

In the normal operation of the launching device or catapult 10, the carriage 12 with the target plane 19 mounted thereon is positioned adjacent the breech block 32 and a cartridge (not shown) is placed in the breech block 32. The cartridge used in the device 10 must produce a gas under high pressure, the discharged gases, however, being maintained at a designated constant pressure in the propulsion tube 27 as the carriage moves in the direction of the launching end of the launcher 10.

Upon the firing of the cartridge, the gases will escape into the end 33 of the propulsion tube 27 rearward of the roller 48 filling that portion of the tube 27. The gases will exert a large force against the roller 48 forcing it to roll forwardly along the framework 11 on its rollers 43. The pressure of the gases in the propulsion tube 27 need not necessarily be high to get a sufficient force to move the carriage 12 at such a speed that will impart to the target plane 19 the desired take off flying speed. For example, utilizing a semi-circular propulsion tube 27 twenty inches in diameter which, when inflated, expands to substantially a circle having a cross sectional area of 300 square inches. For every pound per square inch of gas pressure in the propulsion tube 27 there will be a total force of 30,000 pounds imparted against the roller 48. The sole limitations of this construction are the strength of the fabric of which the propulsion tube is manufactured and the diameter of the propulsion tube that can be conveniently mounted on the launcher 10.

Upon the initial movement of the carriage 12, the inertia of the target plane 19 will cause shear pins securing the plane 19 to the cradle 47 to become sheared. As the gas continues being discharged into the propulsion tube 27, the carriage 12 rolls at increasing speed forwardly on the framework 11 until the arresting strap 51 is engaged by the bumper guard 50 of the carriage 12. At this position the carriage 12 is commencing to deaccelerate and when the roller 48 has passed over the opening 38 in the bed plate 23, the expanding gases in the propulsion tube 27 will escape into the plenum chamber 40 where some of it will escape to the atmosphere through the discharge outlet 41 and some of it will be discharged through the exhaust nozzles 42 and impinge on the deflector plates 49 of the carriage 12. The forces effected by the gases striking the deflector plates 49 is rearward and operates as a brake on the moving carriage 12. At this position, the target plane 19 will continue on its flight and become launched from the carriage 12 while the latter is brought to a full stop by the combined action of the arresting strap 51 and the gases striking the deflector plates 49.

The launching device may be quickly readied for further launchings by removing the cartridge from the breech block 32 and permitting all of the gases in the propulsion tube 21 to escape therethrough as the carriage 12 is rolled back to its starting position adjacent the breech block 32. Now by placing another target plane on the cradle 47, and loading the breech block 32 with another cartridge, the launching device 10 is ready for a further launching of a target plane.

When it is desired to remove or transport the launcher 10, the levelers 22 are unthreaded and the outriggers 21 swung onto the framework 11 as are also the platforms 18. The spade 17 is removed from its impaled position in the ground and the tow bar 16 is mounted on a vehicle that is to pull the launching device 10. The launcher 10 may now be towed to any desired place.

If the cartridge used in generating the gases in the propulsion tube 27 also generates heat which may affect the fabric of the tube 27, the inner wall of the fabric may be painted with a heat reflective lining or a metal mesh may be positioned as a lining at rear end 33 adjacent the breech block 32 of the propulsion tube 27. Since the fabric itself which may be of nylon inserted neoprene cloth is inert there appears to be no necessity for cleaning out the propulsion tube 27 after each firing.

Having thus described my invention, what I claim as new is and desire to secure by Letters Patent of the United States is:

1. A device of the class described comprising support means, inflatable means mounted on said support means in a deflated condition, said inflatable means having end portions, and roller means resting on said support means and resting on said inflatable means, means mounted at one of said end portions for connecting said inflatable means to a source of fluid pressure, and arresting means mounted on said support means adjacent said other end portion of said inflatable means for stopping said roller means whereby upon the release of fluid under pressure at said one end portion said deflated inflatable means becomes inflated and causes said roller means to roll on said inflatable means in the direction of said roller arresting means at said other end.

2. A device of the class described comprising support means, inflatable means mounted on said support means in a deflated condition, said inflatable means having end portions and adapted to form a chamber when inflated, roller means mounted on said support means and resting on said inflatable means, means resting at one of said end portions connecting said inflatable means to a source of fluid pressure for inflating said inflatable means, and arresting means mounted on said support means for stopping said roller means on said support means adjacent said other end portion of said inflatable means whereby upon the release of fluid under pressure at said one end portion said deflated inflatable means becomes inflated and causes said roller means to roll on said inflatable means in the direction of said roller arresting means at said other end.

3. A device of the class described comprising elongated support means, elongated inflatable means mounted on said support means, means mounted at one end of said support means connected to said inflatable means for inflating said inflatable means, roller means mounted on said support means and resting on said inflatable means with said inflatable means in a deflated condition whereby upon the inflating of said inflatable means at said one end of said support means said inflatable means becomes inflated and causes said roller means to roll on said inflatable means in the direction of the other end of said support means, a chamber mounted on said support at said other end, duct means connecting said chamber and said other end of said inflatable means, a source of fluid pressure, exhaust nozzles mounted on said chamber and connected to said source of fluid pressure adapted to discharge fluid pressure in the direction of said one end of said support means, and deflector means cooperatively connected to said roller means adapted to receive fluid pressure discharged by said exhaust nozzles and arresting said roller means against further movement on said support means.

4. A launching device comprising an elongated support, a horizontally disposed plate member mounted on said support, cleats mounted along edge portions of said plate member, an elongated deformable sheet material, means securing edge portions of said sheet material to said cleats to form a chamber having open end portions, connecting means mounted at one end of said support and communicating with one end of said end portions of said sheet material, said connecting means adapted to be connected to a source of fluid under pressure, a plurality of discharge nozzles mounted on said other end of said support, duct means connecting said discharge nozzles and said other end portion of said sheet material, a cylindrical roller mounted on said support and resting on said sheet material, said cylindrical roller rolling on said sheet material toward said other end of said support upon the release of fluid under pressure to said chamber and inflating said deformable sheet material, a carriage mounted on said roller and deflecting means mounted on said carriage adapted to receive fluid under pressure discharged by said discharge nozzles for arresting said cylindrical roller and said carriage.

5. A launching device comprising an elongated support, a horizontally disposed plate member mounted on said support, cleats mounted along edge portions of said plate member, an elongated deformable sheet material having side and end portions, means securing side edge portions of said sheet material to said cleats to form a chamber, connecting means mounted at one end of said support and communicating with said chamber, said connecting means adapted to be connected to a source of fluid under pressure, a cylindrical roller mounted on said support adapted to roll on said sheet material between said ends of said support in the direction of the other end of said support upon the inflation of said deformable sheet material by the release of fluid under pressure into said chamber through said connecting means, a carriage mounted on said roller and an arresting strap mounted at said other end of said support and extending across said support in the path of said roller and said carriage.

6. A device of the class described comprising support means, inflatable means mounted on said support means in a deflated condition, said deformable means having end portions, and roller means mounted on said support means and resting on said inflatable means, and means mounted at one of said end portions for connecting said inflatable means to a source of fluid pressure whereby upon the release of fluid under pressure at said one end portion said deflated inflatable means becomes inflated forcing said roller means to roll on said support in the direction of the other of said end portions.

7. A launching device comprising an elongated support, an elongated deformable member mounted on said support, said deformable member having open end portions and adapted to form a chamber when inflated, a breech block mounted at one end of said support and communicating with one end of said deformable member, a plenum chamber mounted at the other end of said support, said chamber communicating with said other end of said deformable member, a plurality of discharge nozzles mounted on said support and communicating with said plenum chamber, said discharge nozzles constructed and arranged to direct jets of fluid in the direction of said one end of said support, a track mounted along each side of said support, a wheel rotatably mounted in each of said tracks, a shaft connecting said wheels, a cylindrical member mounted on said shaft in contact relation with said deformable member, a carriage supported by said shaft, a plurality of deflector members mounted on said carriage in longitudinal alignment with said discharge nozzles whereby gases discharged by said discharge nozzles impinge on said deflector members to arrest said carriage.

8. A launching device comprising an elongated support, an elongated deformable member mounted on said support, said deformable member having open end portions and adapted to form a chamber when inflated, a breech block mounted at one end of said support and communicating with one end of said deformable member, a discharge nozzle mounted at the other end of said support, said discharge nozzle communicating with said other end of said deformable member, a track mounted along each side of said support, a wheel rotatably mounted in each of said tracks, a shaft connecting said wheels, a cylindrical member mounted on said shaft, said cylindrical member lying on said deformable member, a plane carrying carriage supported by said shaft, an arresting strap mounted transversely of said support in proximity of said other end of said support, and hydraulically operated means secured to said arresting strap for arresting said carriage.

9. A launching device comprising an elongated support, a horizontally disposed plate member mounted on said support, cleats mounted along edge portions of said plate member, a rectangular shaped sheet material, said sheet material being deformable and impervious to fluids, means securing edge portions of said sheet material to said cleats thereby forming a chamber, a breech block mounted at one end of said support and secured to one end portion of said sheet material whereby gases under pressure generated at said breech block will be received by said chamber, a plenum chamber mounted at the other end of said support, said plenum chamber having an exhaust nozzle at one end and said other end communicating with said other end portion of said sheet material, a plurality of discharge nozzles mounted on said support and communicating with said plenum chamber, said discharge nozzles being inclined in a direction toward said one end of said support, a track mounted along each side of said elongated support, a pair of wheels mounted in each of said tracks, a front and rear shaft connecting each pair of said wheels, a plane supporting cradle mounted on said shafts, a cylindrical roller mounted on said rear shaft and resting on said sheet material in a deflated condition whereby upon the release of gases under pressure at said breech block into said chamber said sheet material becomes inflated forcing said cylindrical roller to roll in the direction of said other end of said support, a plurality of deflector members mounted on said cradle between said shafts, said deflector members facing in the direction of said other end of said support whereby gases discharged through said discharge nozzles will impinge on said deflector members and effect a braking action on said cradle.

10. The structure as recited by claim 9 and a strap mounted transversely across said elongated support member in proximity of said discharge nozzles, said strap adapted to be engaged by said cradle, and hydraulically operated means mounted on said support member and connected to said strap for effecting the braking of said cradle.

References Cited in the file of this patent

UNITED STATES PATENTS

| | | |
|---|---|---|
| 116,057 | Howe | June 20, 1871 |
| 1,802,649 | Heinkel | Apr. 28, 1931 |
| 2,493,014 | Nelson | Jan. 3, 1950 |
| 2,731,219 | Cotton et al. | Jan. 17, 1956 |